US007382595B2

(12) United States Patent
Thurk et al.

(10) Patent No.: US 7,382,595 B2
(45) Date of Patent: Jun. 3, 2008

(54) LOW VOLTAGE OVERCURRENT PROTECTION FOR SOLID STATE SWITCHING SYSTEM

(75) Inventors: John P. Thurk, Madison, WI (US); Eric G. Rasmussen, Waunakee, WI (US); Eric W. Suomi, Madison, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 150 days.

(21) Appl. No.: 11/137,053

(22) Filed: May 25, 2005

(65) Prior Publication Data

US 2006/0268484 A1 Nov. 30, 2006

(51) Int. Cl.
*H02H 9/08* (2006.01)

(52) U.S. Cl. .................................. 361/93.1; 315/294
(58) Field of Classification Search ............ 361/93.1
See application file for complete search history.

(56) References Cited

U.S. PATENT DOCUMENTS

| | | | | |
|---|---|---|---|---|
| 4,933,798 | A | | 6/1990 | Widmayer et al. ............ 361/18 |
| 5,045,774 | A | | 9/1991 | Bromberg .................. 323/322 |
| 5,239,255 | A | | 8/1993 | Schanin et al. ............. 323/237 |
| 5,424,618 | A | | 6/1995 | Bertenshaw et al. ........ 315/324 |
| 5,475,609 | A | * | 12/1995 | Apothaker .................. 700/292 |
| 5,500,575 | A | | 3/1996 | Ionescu ...................... 315/307 |
| 5,621,603 | A | * | 4/1997 | Adamec et al. ............. 361/154 |
| 6,407,515 | B1 | * | 6/2002 | Hesler et al. ............... 315/294 |
| 6,507,794 | B1 | * | 1/2003 | Hubbard et al. .............. 702/60 |
| 6,617,805 | B2 | * | 9/2003 | Ribarich et al. ............ 315/247 |
| 6,970,339 | B2 | * | 11/2005 | Wong et al. ................ 361/93.1 |
| 2002/0079849 | A1 | | 6/2002 | Mason et al. | |

OTHER PUBLICATIONS

Microchip Technology Inc. PIC16C72 Series Data Sheet 1998 pp.1-125.*
Extended European search report for Application No. 06270016.6-2206 dated Sep. 18, 2006.
Klumpner et al.; "A New Matrix Converter Motor (MCM) for Industry Applications"; IEEE Transactions on Industrial Electronics; vol. 49, No. 2; Apr. 2002.
Blaabjerg et al.; Single Current Sensor Technique in the DC Link of Three-Phase PWM-VS Inverters: a Review and a Novel Solution; IEEE Transactions on Industry Applications; vol. 33, No. 5; Sep./Oct. 1997.

* cited by examiner

*Primary Examiner*—Michael Sherry
*Assistant Examiner*—Luis Román
(74) *Attorney, Agent, or Firm*—Greer, Burns & Crain, Ltd.

(57) ABSTRACT

A current sensing transformer having a low impedance primary winding is connected in series with a filter and load circuit supplied with output current by a high frequency switching PWM power supply such as a sinewave dimmer. Sensed output current is supplied to a microprocessor based programmable controller. The controller performs a routine including a family of overcurrent tests. Tests of the family are satisfied by the presence of different output current values for different time durations. At least one of the tests is enabled only at low requested output voltages or dimming levels. In response to satisfaction of any of the tests, a series power switching stage of the power supply is rendered nonconductive to shut down the power supply.

7 Claims, 3 Drawing Sheets

LOW VOLTAGE OVERCURRENT PROTECTION FOR SOLID STATE SWITCHING SYSTEM

FIELD OF THE INVENTION

The present invention relates to overcurrent protection of solid state switches, such as those used for pulse width modulation in sinewave dimmers, particularly in low voltage and duty cycle conditions.

DESCRIPTION OF THE PRIOR ART

High frequency, high power solid state switches, namely metal oxide semiconductor field effect transistors (MOSFETs) and insulated gate bipolar transistors (IGBTs), are used in switching systems for switch mode or pulse width modulation (PWM) power supplies. One application for such systems is lamp dimmers. In this application, a lamp is provided with power by a dimmer so that the lamp can be operated at variable, selected light intensity levels. For example, luminaires for theatrical, architectural and other applications are often provided with operating power by dimmers.

Phase angle dimmers for this purpose are well known, and typically include solid state switches such as SCRs for interconnecting an AC power source to a lamp load. A phase control circuit renders a solid state switch conductive at a point during a half cycle of the sinusoidal AC supply voltage, the point being selected to supply to the lamp a lamp operating pulse having a desired quantity of power in order to produce a desired level of light intensity. The abrupt low frequency switching during the half cycles of the power supply and resultant abrupt amplitude changes in the current supplied to a luminaire can cause problems of electrical noise and mechanical filament noise, requiring extensive filtering. In some dimmer applications, even with filtering, the noise incident to phase angle dimming can be unacceptable. In addition, phase angle dimmers have the disadvantage that they can reflect harmonic distortion into the mains power supply.

To avoid the potential problems it has been proposed to use pulse width modulation (PWM) techniques with solid state switches operating at a higher frequency. With this type of dimmer power supply, known as a switch mode or PWM power supply, light intensity is varied by changing the pulse width modulation duty cycle. The output, after filtering in an output load filter, can have a shape similar to the power supply wave form with attenuated amplitude. Typically both the input power supply and the attenuated output are sine waves. For this reason, pulse width modulation dimmers are also described as sinewave dimmers.

In order to avoid damage to the components of the dimmer and in the output circuit, overcurrent protection is provided. In the past, input current responsive circuit breakers have been used in the input circuit between the AC supply and the power switching stage in an attempt to prevent overcurrent damage. However, circuit breakers are slow acting, electromechanical devices that cannot react fast enough to discontinue current through solid state switches before they are damaged by excess current. In our pending U.S. patent application Ser. No. 11/048,123 filed on Jan. 31, 2005, we disclose and claim an active overcurrent protection system that senses output current directly at the solid state switch and quickly interrupts current flow in response to an overcurrent condition. The system uses both hardware (or electronic) protection and programmable (or software) protection to provide overcurrent protection that is effective under most conditions to prevent damage resulting from excessive current flow through the switching devices.

However, a problem can exist when the dimmer is operating at low voltages and low intensity dimming levels. A high frequency, high power solid state switching system such as a sinewave dimmer functions like an electronic transformer, with power in the input circuit corresponding to power in the output or load circuit. At low requested light intensity dimming levels, a relatively low voltage is present in the output circuit. If a short circuit or low impedance condition is present in the output circuit, a large current may be present in the output circuit. However, the current in the input circuit is smaller because the voltage in the input circuit is larger. A circuit breaker or other current sensing device in the input circuit cannot reliably protect against large currents in the output circuit.

Although the active overcurrent protection circuit of our U.S. patent application Ser. No. 11/048,123 filed on Jan. 31, 2005, can protect against some overcurrent conditions at low voltages, that circuit responds quickly to currents over a relatively large threshold value. The large threshold value, for example, permits the dimmer to supply large cold filament or reactive ballast inrush currents. Under certain conditions, currents present at low voltages can be harmful to the sinewave dimmer or to the output circuit even if the currents are below the threshold value.

U.S. Pat. No. 5,045,774—Bromberg and U.S. Pat. No. 5,424,618—Bertenshaw et al. disclose sinewave dimmers including sensing devices for sensing a condition in the load circuit and using feedback for control of the dimmer. U.S. Pat. No. 5,500,575—Ionescu discloses a sinewave dimmer having a current sensing transformer providing a current signal that is compared with a reference value in order to limit output current in response to an output overload or short circuit. This approach cannot operate reliably and without nuisance shutdowns with a variety of loads and conditions.

SUMMARY OF THE INVENTION

A primary object of the present invention is to provide improved overcurrent protection for solid state switching systems such as switching power supplies having high power, high frequency solid state switches, particularly under low output voltage conditions.

In brief, in accordance with the invention there is provided a method for overcurrent protection of a solid state high frequency switching PWM power supply. The method includes filtering the output of a series solid state switch and supplying the filtered output current to a load circuit. The filtered output current supplied to the load circuit is sensed, and the sensed output current is supplied to a microprocessor based programmable controller. A family of overcurrent tests is performed in the controller. The family of tests includes a plurality of different tests satisfied by the presence of different output currents for different time durations. An overcurrent condition is established in response to satisfaction of any of the family of tests. The series solid state switch is switched to a nonconductive condition in response to the overcurrent condition.

BRIEF DESCRIPTION OF THE DRAWING

The present invention together with the above and other objects and advantages may best be understood from the following detailed description of the preferred embodiment of the invention illustrated in the drawings, wherein.

DETAILED DESCRIPTION OF THE PREFERRED EMBODIMENT

Figure 1:
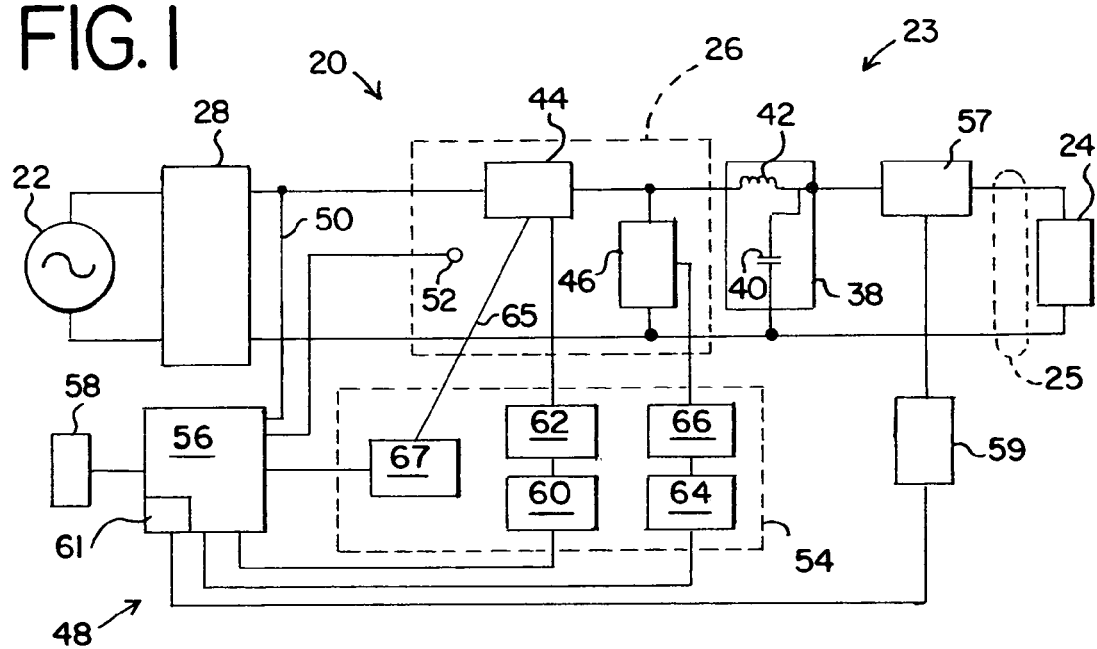
FIG. 1 is a block diagram of a sinewave dimmer having a solid state switching system protected by a low voltage overcurrent protection system in accordance with the present invention.

Having reference now to the drawing, FIG. 1 is a simplified block diagram of a sinewave dimmer designated as a whole by the reference character 20 having a solid state power switching stage 26. In accordance with the present invention, the switching stage 26 and an output circuit 25 are protected by a low voltage overcurrent protection system constructed in accordance with the principles of the present invention and generally designated as 23.

The dimmer 20 is connected to a conventional mains power supply 22 providing a sinusoidal alternating current power supply waveform of, for example, 60 hertz and nominal 120 volts ac. The dimmer 20 provides output power to a load 24 that is included in the output circuit or output branch circuit 25. In a typical application, the load 24 may be a resistive load such as an incandescent lamp, or a reactive load such as a power supply for a gas discharge lamp or fluorescent lamp. The branch circuit 25 includes conductors and connectors and typically extends to a lamp or load location remote from the dimmer 20. The power switching stage 26 uses pulse width modulation (PWM) to attenuate input power and supply reduced output power to the load.

Figure 2:
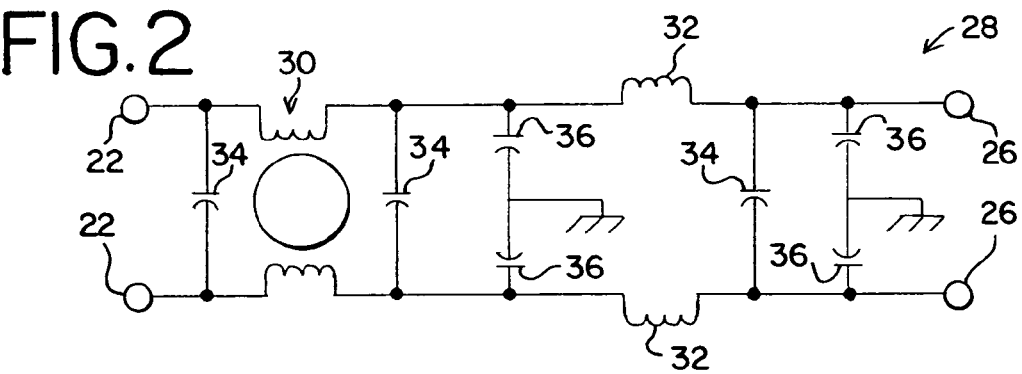
FIG. 2 is a schematic diagram of the input line filter of the dimmer.

An input line filter 28 filters out noise that may be present on the power supply signal and assures the supply of clean ac power to the power switching stage 26. In addition the input line filter 28 filters out switching noise from the power switching stage 26 and prevents the conduction of noise back to the power supply 22. Preferably the input line filter 28, as seen in FIG. 2, is a high order line filter including a common mode inductor 30, differential mode inductors 32, line to neutral differential mode X capacitors 34 and line/neutral to earth ground common mode Y capacitors 36.

The PWM switching operates at a high frequency, for example over 20,000 hertz, 50,000 hertz being presently preferred. Output load filter 38 filters out the PWM switching frequency of the power switching stage 26 and reconstructs the output voltage waveform into a line frequency, variable amplitude sinewave with the same frequency as the power supply sinewave. Preferably, the output load filter typically may include bypass capacitance represented by capacitor 40. The main component of the load filter is an output inductor 42 in series with the load 24 that stores energy and smoothes the output waveform. In order to accommodate a wide range of load values, preferably the inductor 42 is a swinging inductor. For example, the inductor 42 can have a reactance of 10 mH at an output current of 0.25 amp, a reactance of 1 mH at an output current of 10 amps and a reactance of 0.5 mH at an output current of 20 amps.

The power switching stage 26 includes a series switching section 44 connected in series between the power supply 22 and the series connected load 24 and load inductor 42. The power switching stage 26 also includes a clamp switching section 46 shunted across the series connected load 24 and load inductor 42. The series switching section 44 is alternately rendered conductive and nonconductive at a high frequency with a PWM signal having a duty cycle chosen to provide a desired output voltage corresponding to a desired dimming level. The clamp switching section 46 is alternately rendered nonconductive and conductive by the inverse of the PWM signal so that the clamp switching section 46 is nonconductive when the series switching section 44 is conductive, and so that the series switching section 44 is nonconductive when the clamp switching section 46 is conductive. The power switching stage 26 preferably operates at a high frequency of at least 20 kilohertz, with about 50 kilohertz being preferred.

A microprocessor based programmable controller 56 controls the operation of the series and clamp switching sections 44 and 46. The controller 56 includes or has access to program and data memory and is programmable by instructions loaded into program memory in the form of data received from a data input-output bus or device 58. One example of a programmable controller suitable for the practice of the present invention is a Model 56F803 hybrid digital signal processor (DSP) and controller sold by Freestyle Semiconductor, Inc. (Motorola) and described in 56F803 Evaluation Module Hardware User's Manual, Rev. 4, Jun. 3, 2003, incorporated herein by reference.

The controller 56 under software control supplies high frequency PWM series switching control signals to the series switching section 44 through an opto-isolation circuit 60 and a driver circuit 62. Similarly, the controller 56 under software control supplies high frequency inverse PWM series switching control signals to the clamp switching section 46 through an opto-isolation circuit 64 and a driver circuit 66. The isolation circuits 60 and 64, and the driver circuits 62 and 66 are incorporated in a gate driver stage 54. A further disclosure of the construction and operation of components of the dimmer 20, including the control of the series and clamp switching sections 44 and 46 of the power switching stage 26 by the controller 56 may be found in U.S. patent application Ser. No. 10/971,682, filed on Oct. 21, 2004, incorporated herein by reference.

On line 50 the controller 56 receives a feedback signal indicating the power supply voltage. This signal is used under software control for power signal zero crossing detection, and for adjusting the PWM and inverse PWM control signals in order to accurately regulate the output voltage to achieve the desired output voltage and dimming level. A sensor 52 associated with the power switching stage 26 provides an operating temperature feedback signal that may be used, for example, for excess temperature power decrease or shutoff capability.

An active, fast acting overcurrent protection system 48 prevents damage to the power switching stage 26 in the event that current in the series switching section 44 exceeds a high threshold value. The system 48 includes current sensors associated with the series switching section 44. Signals corresponding to sensed current are coupled through a low resistance, interference resistant link 65 to an overcurrent detection logic section 67 located in the gate driver stage 54. When solid state switching devices of the series switching section 44 are in an overcurrent state, the logic section 67 provides overcurrent signals to the programmable controller 56. The controller 56 performs a routine for preventing overcurrent damage to the power switching stage 26 by rendering the series switching section 44 nonconductive and rendering the clamp switching section 46 conductive. The threshold overcurrent level for a dimmer having a twenty amp current capacity rating is preferably a high value of, for example 205 amps to permit cold filament inrush current for an incandescent lamp or other lamp start up conditions.

The low voltage overcurrent protection system 23 of the present invention includes a load current sensor 57 in series with the load 24. The current sensors for the active overcurrent protection system 48 are located within the switching section 44, and sense the current being switched before the output waveform is shaped by the output load filter 38. The load current sensor 57 of the low voltage overcurrent protection system 23 is located in the load circuit between the output load filter 38 and the load 24, and senses the output current in the load circuit 25. The sensed load current is coupled through a load current processing circuit 59 to the programmable controller 56. The controller 56 includes an analog to digital (AD) converter section 61 providing the load current information in digital form to the controller 56.

The controller 56 processes this load current information. Within the controller 56, the root means square (RMS) value of the load current is computed and stored. This information may be used in connection with the control of the dimming of the load 24, and may be coupled through the bus or device 58 for use by a remote controller or by a user. In accordance with the present invention, the stored RMS load current information is used in a routine performed by the processor 56 to protect the dimmer 20 and the load circuit against a number of different overcurrent conditions, including low voltage overcurrent conditions.

Figure 3:
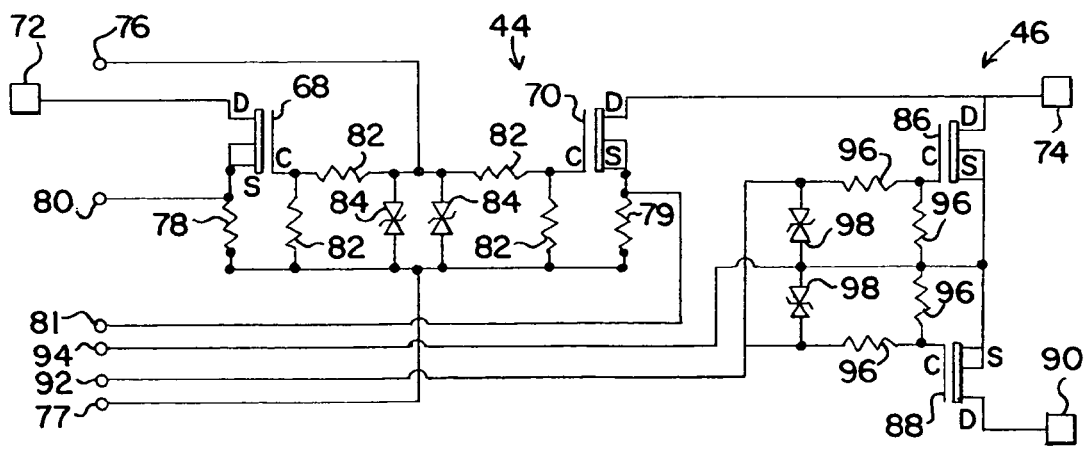
FIG. 3 is a schematic diagram of the power switching stage of the dimmer.

The power switching stage 26 is shown in more detail in FIG. 3. The series switching section 44 includes a complementary pair of MOSFETs 68 and 70 functioning as a high speed, high power, bidirectional switch connected in series between a power supply terminal 72 connected to the line input filter 28 and a load output terminal 74 connected to the inductor 42 of the output load filter 38. The MOSFETs 68 and 70 are simultaneously rendered conductive or nonconductive by a high frequency PWM control signal supplied by the controller 56 and applied through opto-isolator circuit 60 and driver circuit 62 across a gate control input terminal 76 and a ground terminal 77.

Current sensing resistors 78 and 79 are connected between ground and the source terminals of the MOSFETs 68 and 70 to provide signals to terminals 80 and 81 for transmission across the link 65 to the logic section 67. The resistors 78 and 79 are connected directly to the output terminals of MOSFETs 68 and 70, in that there are no circuit components separating the resistors and the output terminals. Resistors 82 serve as bleeder resistors and stabilizing series resistors connected to the gate terminals of the MOSFETs 68 and 70. Bidirectional zeners 84 provide transient protection.

The clamp switching section 46 includes a complementary pair of MOSFETs 86 and 88 functioning as a high speed, high power, bidirectional switch connected in series between the load output terminal 74 and a load neutral terminal 90. The MOSFETs 86 and 88 are simultaneously rendered nonconductive or conductive by a high frequency inverse PWM control signal supplied by the controller 56 and applied through opto-isolator circuit 64 and driver circuit 66 across a gate control input terminal 92 and a ground terminal 94. Resistors 96 function as bleeder resistors and stabilizing series resistors connected to the gate terminals of the MOSFETs 86 and 88. Bidirectional zeners 98 provide transient protection.

MOSFETs are the preferred type of high power solid state switching devices for the illustrated dimmer circuit 20 because of their superior high speed and high power switching characteristics. In addition, the bidirectional nature and fast switching speeds of MOSFETs make them preferable for a dimmer having both series and clamp high speed switching. However in other applications, IGBTs, might be used as high frequency, high power solid state switches, and the principles of the present invention can be applied to such other applications.

The construction and operation of the active overcurrent protection system 48, including the current sensing resistors 78 and 79, the low resistance, interference resistant link 65, the overcurrent detection logic section 67 and the related routines performed by the controller 56 are described in our pending U.S. patent application Ser. No. 11/048,123 filed on Jan. 31, 2005. That pending U.S. patent application Ser. No. 11/048,123 filed on Jan. 31, 2005, is incorporated by reference herein.

Figure 4:
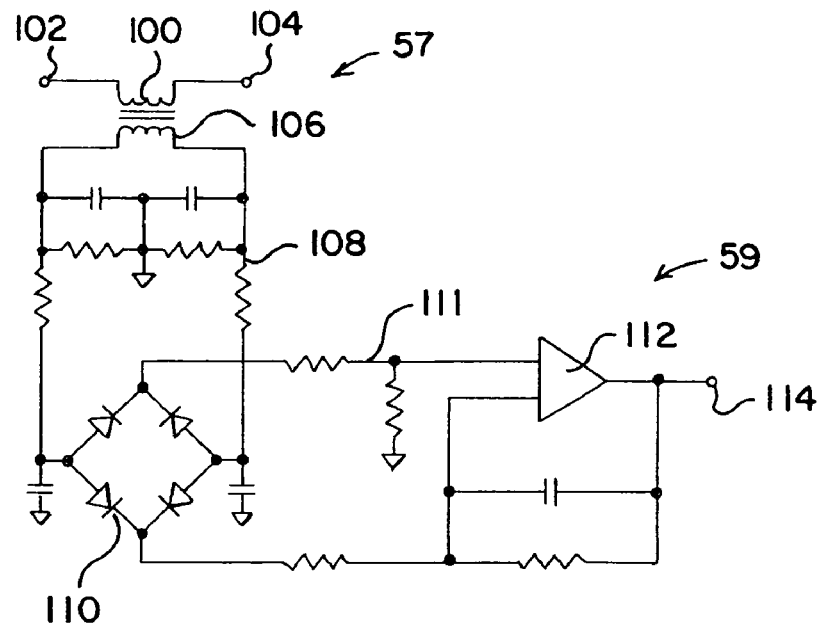
FIG. 4 is a schematic diagram of the load current sensor and the load current processing circuit of the overcurrent protection system.

Referring now to FIG. 4, the load current sensor 57 and the load current processing circuit 59 of the low voltage overcurrent protection system 23 are schematically illustrated. Although a resistor or other component could be used to sense the output load current, it is preferred that the current sensor 57 is a current sensing transformer having a very low impedance primary winding 100 connected by a terminal 102 in series with the output inductor 42 of the output load filter 38 and by a terminal 104 to the output circuit 25 and the load 24. A secondary winding 106 of the current sensing transformer 57 is coupled through a filter and load network 108 to the input of a full wave diode bridge rectifier 110. The full wave rectified load current signal from the output of the rectifier bridge 110 is coupled through a network 111 and through an amplifier 112 to an output terminal 114 connected to the AD converter section 61 of the processor 56. The processor 56 uses this digital information to compute and maintain in memory an output or load current RMS value.

In the illustrated embodiment of the invention, the dimmer 20 is rated as a twenty amp dimmer, capable of supplying twenty amps at full voltage to the load circuit 25 and the load 24. Because it is desired to have the capability to use the sensed load current value for control and indication functions, in addition to use by the overcurrent protection system 23, the current sensing transformer 57 is designed to provide accurate current sensing in the current range of zero to about thirty amps. This type of sensing transformer saturates and does not provide accurate sensing at elevated current levels.

Figure 5:
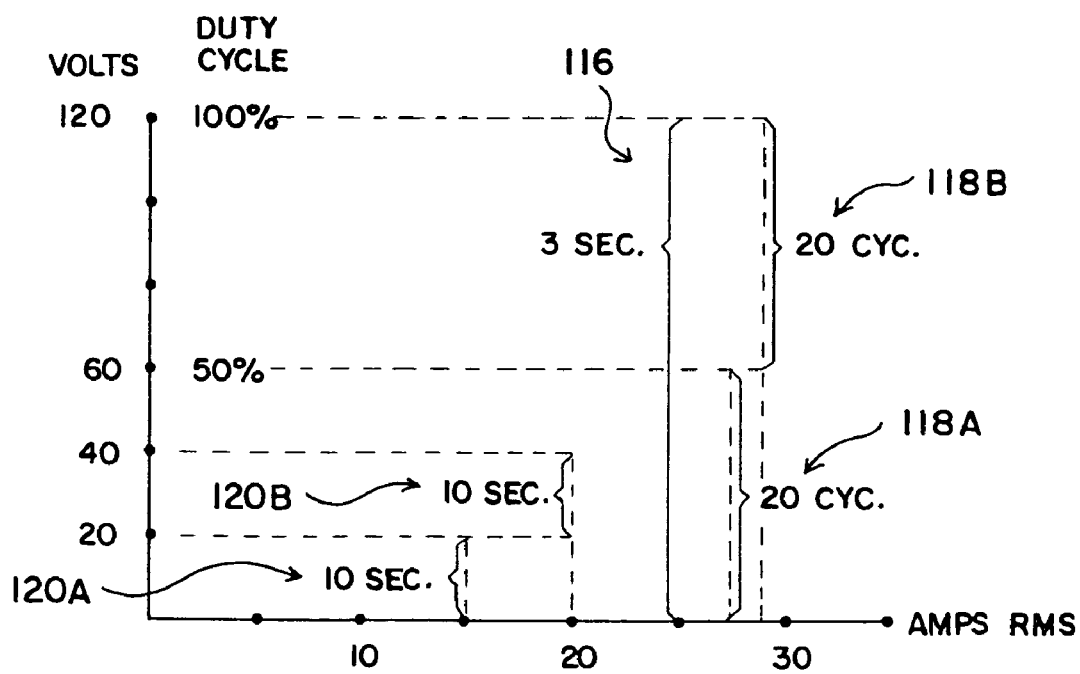
FIG. 5 is a graphical illustration of the operation of the overcurrent protection system.

FIG. 5 is a graphical illustration of a family of different overcurrent protection tests or comparisons that are performed by the low voltage overcurrent protection system 23 of the present invention. Each of these tests or comparisons may reveal a potentially damaging overcurrent condition, and different types of overcurrent conditions are detected by the different tests. If any one of these overcurrent protection tests or comparisons reveals an overcurrent condition, the dimmer 20 is shut down to avoid damage to the dimmer or potential damage in the output circuit 25.

In the graph of FIG. 5, the vertical axis represents dimming level, or voltage requested by the user or controller through the bus or device 58. The relationship between requested voltage and dimming level is generally linear. For example, in a 120 volt system as illustrated, full load current or full lamp intensity is represented by a 100% dimming level, corresponding to maximum requested voltage of 120 volts. A 50% dimming level corresponds to a requested voltage of 60 volts. The horizontal axis of the graph of FIG. 5 represents the RMS load or output current provided by the dimmer 20 to the load circuit 25 as sensed by the sensor 57.

One comparison or test performed by the overload protection circuit 23, designated by the reference character 116 in FIG. 5, is a relatively slow, or long duration, general test for overcurrent. This test 116 functions independently of requested voltage. Regardless of the requested dimmer level or voltage amplitude, this test results in an overcurrent result if a load current in excess of 25 amps is sensed for a duration of over three seconds. The illustrated dimmer 20 is intended for use with lamps rated at not more than twenty amps, and therefore a load current of 25 amps with a duration of over three seconds qualifies as a potentially harmful overcurrent condition.

Another pair of tests or comparisons are relatively fast, or short duration, tests intended to prevent overcurrent damage to the power switching stage 26 resulting from a short circuit or very low impedance load in the output circuit 25. One of the tests of this pair, designated as 118A, is performed when the requested dimming level is less than 50% and the requested voltage is less than 60 volts. In this condition, if the sensed RMS load current exceeds 27.5 amps for 20 cycles of the power supply waveform (or one-third of a second) an overcurrent condition is indicated. The other test of this pair, designated as 118B, is performed when the requested dimming level is 50% or greater and the requested voltage is 60 volts or greater. In this condition, if the sensed RMS load current exceeds 29 amps for 20 cycles of the power supply waveform (or one-third of a second) an overcurrent condition is indicated.

Tests 118A and 118B function to shut down the dimmer 20 rapidly if the dimmer is supplying excess current into a load circuit 25 and/or load 24 that is shorted or has an abnormally low impedance. In this condition, even if the current is not large enough to result in shutdown by the active overcurrent protection system 48, nevertheless the current can be large enough to cause damage in a relatively short period of time to the series switching MOSFETs 68 and 70 in the power switching stage 26. Shutdowns resulting from the tests 118A and 118B occur faster than the protection that can be provided by a circuit breaker circuit at the input to the dimmer 20, and in addition can protect against output circuit overcurrent conditions that do not exhibit overcurrent levels at the input to the dimmer 20.

Another pair of tests or comparisons performed by the low voltage overcurrent protection system 23 are relatively slow, or long duration, tests serving to prevent possible damage due to heat buildup or the like in the output circuit 25 due to overcurrents at low requested voltage levels. Power at the input to the dimmer corresponds to power in the output circuit. However, the high voltage at the input can accompany a relatively low input current even though, with a low voltage in the output circuit 25, the load current can be large enough to cause a danger of overheating and damage in the output circuit 25. An input circuit breaker or other input current sensing arrangement does not protect the output circuit in this low voltage, high output current situation.

The test designated as 120A is effective when the requested voltage is less than 20 volts. In this condition, an overcurrent indication results if a load current of 15 amps persists for more than ten seconds. Test 120B is effective when the requested voltage is less than 40 volts and is twenty or more volts. In this condition, an overcurrent indication results if a load current of twenty amps persists for more than ten seconds. Although load currents of 15 or 20 amps are in the operating range of the dimmer 20, load currents of this magnitude do not normally exist at low dimming levels and low requested voltages. Such currents at low voltages can result in heat buildup and a potentially dangerous condition in the output circuit 25.

The family of tests 116, 118A, 118B, 120A and 120B is effective to avoid overcurrent damage, and does not result in nuisance shut downs of the dimmer 20. Dimmer 20 may be used to control devices such as incandescent lamps and reactive and/or magnetic ballasts having long duration, high inrush current characteristics. The test parameters of the overcurrent protection system 23 are chosen so that normal operation of such devices does not result in overload indications.

Figure 6:
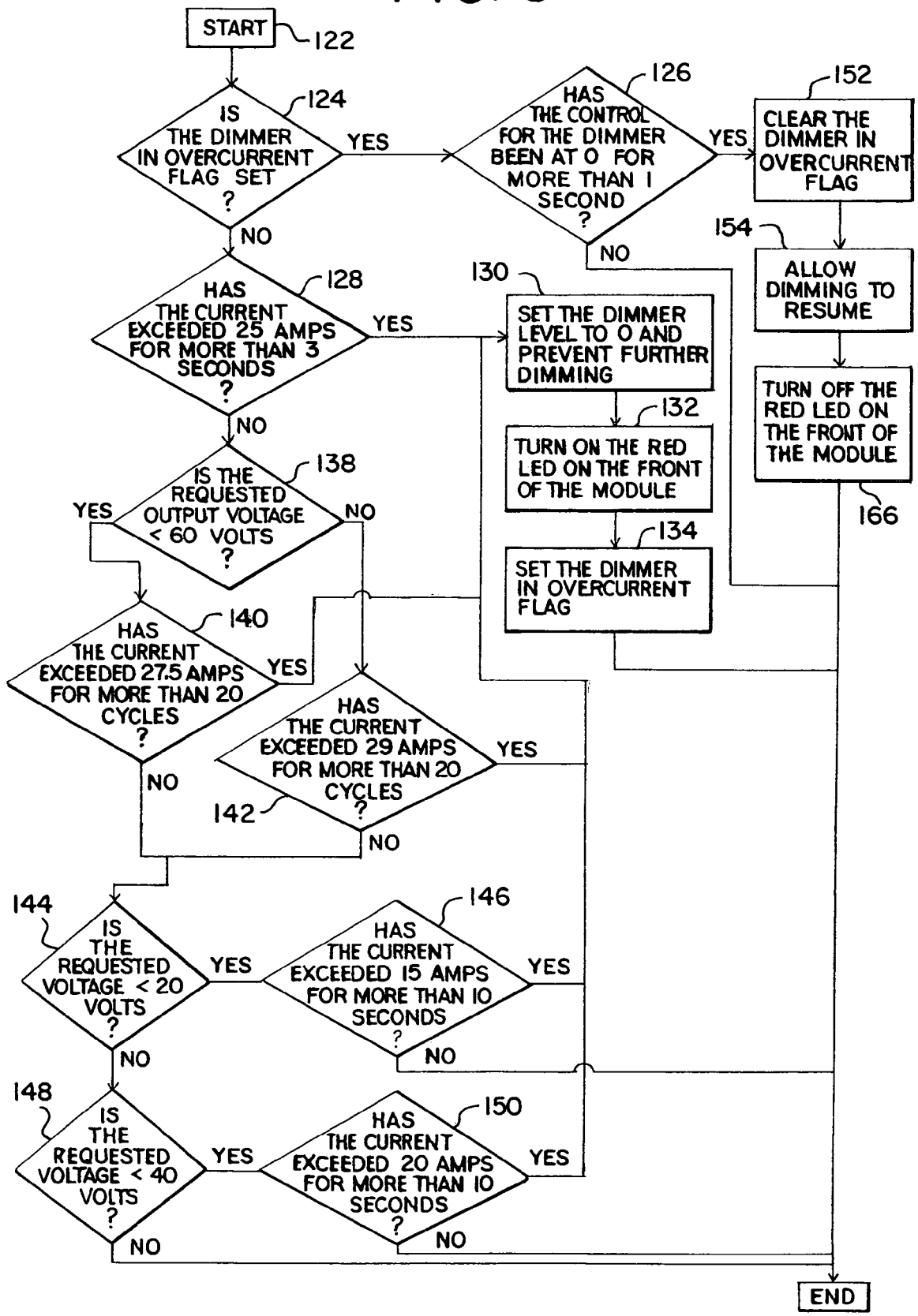
FIG. 6 is a flow chart of a routine performed by the programmable controller to process overcurrent signals from the load current sensor and the load current processing circuit.

The microprocessor based programmable controller 56 under software and user control performs the routine illustrated in FIG. 6 to perform the tests or comparisons seen in FIG. 5, and to shut down the dimmer 20 in the event that any of the tests results in an overcurrent indication. The controller 56 detects zero crossings of the AC power supply waveform. This routine of FIG. 6 runs every half cycle of the power supply waveform, 120 times per second, and starts at block 122. Counts are maintained in memory by the controller 56 of the RMS load current values for the time periods used in the tests 116, 118A, 118B, 120A and 120B. The routine of FIG. 6 interrogates these count values in performing the overcurrent tests.

An overcurrent flag is established in controller memory for indicating the software overcurrent status. In the absence of a sensed overcurrent condition the flag is set false. The overcurrent flag is interrogated at block 124. If the overcurrent flag is determined to be set true, this means that an overcurrent condition has been previously encountered. An overcurrent indication can be initiated by the low voltage overcurrent routine of FIG. 6 of the system 23, or by the active overcurrent routine 48. If the overcurrent flag is set, the routine proceeds to block 126. If the overcurrent flag is false at block 124, the routine performs the tests 116, 118A, 118B, 120A and 120B seen graphically in FIG. 5.

Test 116 is performed in block 128. The routine interrogates a RMS load current count. If the load current has exceeded 25 amps for more than three seconds, then the routine at block 130 sets the dimming level to zero. The series switching MOSFETs 68 and 70 are rendered nonconductive (open) and the clamp switching MOSFETs 86 and 88 are rendered conductive (closed). Opening the MOSFETs 68 and 70 discontinues the flow of the excessive current sensed in the load circuit. Closing of the MOSFETs 86 and 88 limits voltage transient spikes that could otherwise cause damage. At block 132, an overcurrent alert indication is initiated, and at block 134, the overcurrent flag is set to true. The routine ends at block 136 with the system in overcurrent state.

If the routine does not indicate an overcurrent state at block 128, then the routine proceeds to block 138. A determination is made whether or not the requested voltage is less than 60 volts. If it is less than 60 volts, then test 118A is performed at block 140, and if 60 volts or more, then test 118B is performed at block 142. If either test results in an overcurrent indication, the routine proceeds to blocks 130, 132 and 134 to establish an overcurrent condition.

If neither test 118A or 118B results in an overcurrent indication, the routine proceeds to block 144 where is determined whether the requested voltage is less than 20 volts. If it is, then test 120A is performed at block 146. If the RMS load current has exceeded 15 amps for more than ten seconds, then the overcurrent routine of blocks 130, 132 and 134 is performed. If it is determined at block 144 that the load current is not less than 20 volts, then in block 148 it is determined whether the requested voltage is less than 40 volts. If it is, then test 120B is performed at block 146. If the RMS load current has exceeded 20 amps for more than ten seconds, then the overcurrent routine of blocks 130, 132 and 134 is performed.

If the load current is determined to be 40 volts or higher in block 148, or if no overcurrent condition is found in block 150, then the routine ends in block 136 with no overcurrent condition established. The routine repeats the next, and each subsequent, half cycle.

In response to an overcurrent alert as issued at block 132 of FIG. 6, the user may correct the cause of the overcurrent condition and send a reset signal to the controller 56 from the data input-output bus or device 58. The reset may take any desired form. In the presently preferred embodiment of the invention, a reset signal consists of an instruction for a zero magnitude dimmer output for a duration of at least one second.

At the beginning of the FIG. 6 routine, at block 124, the overcurrent flag is interrogated. If the overcurrent flag is true and the dimmer 20 is in a shutdown state, then at block 126 the routine checks for a user reset signal. If no reset signal is received at block 126, the routine ends at block 136. If a reset signal is received at block 126, the overcurrent flag is set to false at block 152, normal dimming operation is resumed at block 154 and the overcurrent alert is discontinued at block 166 before the routine ends at block 136.

While the present invention has been described with reference to the details of the embodiment of the invention shown in the drawing, these details are not intended to limit the scope of the invention as claimed in the appended claims.

What is claimed is:

1. A method for overcurrent protection of a solid state high frequency PWM switching power supply connected to an AC power source, the power supply having a maximum current capacity rating and being operated with a duty cycle corresponding to a dimming level and output voltage, the duty cycle, dimming level and output voltage being variable in a range between minimum and maximum values, said method comprising:

filtering the output of a series solid state switch;
   supplying the filtered output current to a load circuit;
   sensing the filtered output current supplied to the load circuit;
   providing the sensed output current to a microprocessor based programmable controller;
   performing a family of overcurrent tests in the controller during each cycle of the AC power source, the family of tests including a plurality of different tests satisfied by the presence of different output currents for different time durations;
   establishing an overcurrent condition in response to satisfaction of any of the family of tests;
   switching the series solid state switch to a nonconductive condition in response to the overcurrent condition;
   detecting zero crossings of the AC power source, and performing the family of overcurrent tests in the controller following each zero crossing of the AC power source;
   a first test of the family of tests including determining if the output voltage is in a predetermined portion of the range between minimum and maximum values and determining if the current exceeds an overcurrent threshold value for a predetermined first duration of time, the overcurrent threshold value being smaller than the maximum current capacity rating, and
   a second test of the family of tests being carried out only when the output voltage is in the lower third of the output voltage range.

2. The method for overcurrent protection of claim 1, the family of tests including as a third test, testing for an output current having a value greater than the maximum current capacity rating for a second time duration.

3. The method for overcurrent protection of claim 2, said first time duration being greater than said second time duration.

4. The method for overcurrent protection of claim 3, further comprising enabling the third test throughout the entire voltage range of the power supply.

5. A method for overcurrent protection of a sinewave dimmer having a PWM switching stage operated with a duty cycle corresponding to a dimming level and output voltage, the duty cycle, dimming level and output voltage being variable in a range between minimum and maximum values, the sinewave dimmer having an inductive output filter for supplying output current to an output circuit, said method comprising:

sensing the output current flowing between the inductive output filter and the output circuit;
   performing an overcurrent detection test including comparing the output current to an overcurrent threshold current value; and
   shutting down the sinewave dimmer in response to detection of an overcurrent condition;
   the method being characterized by said performing an overcurrent detection test step being carried out only when the output voltage is in a predetermined portion of the range between minimum and maximum values, the predetermined portion is in the lower third of the range, and said shutting down step including setting the duty cycle to zero.

6. A method as claimed in claim 5 wherein said setting the duty cycle to zero includes rendering a series solid state switch of the switching stage nonconductive and rendering a clamp solid state switch of the switching stage conductive.

7. A method for overcurrent protection of a sinewave dimmer having a PWM switching stage operated with a duty cycle corresponding to a dimming level and output voltage, the duty cycle, dimming level and output voltage being variable in a range between minimum and maximum values, the sinewave dimmer supplying output current to an output circuit, said method comprising:

sensing the output current flowing in the output circuit;
   performing an overcurrent detection test including determining if the output voltage is in a predetermined portion of the range between minimum and maximum values and if the output current exceeds an overcurrent threshold current value for a predetermined duration of time;

the predetermined portion being in the lower value part of the range of output voltage range;

the threshold current value being smaller than a current capacity is rating of the sinewave dimmer;

the duration of time being a plurality of seconds; and shutting down the sinewave dimmer in response to detection of an overcurrent condition.

* * * * *

UNITED STATES PATENT AND TRADEMARK OFFICE
CERTIFICATE OF CORRECTION

PATENT NO. : 7,382,595 B2 Page 1 of 1
APPLICATION NO. : 11/137053
DATED : June 3, 2008
INVENTOR(S) : Thurk et al.

It is certified that error appears in the above-identified patent and that said Letters Patent is hereby corrected as shown below:

Col. 2, line 32        Please delete the word "Ionescu" and insert --Ionescu-- in its place.

Claim 7       Col. 11, line 4       After "capacity", please delete the word "is".

Signed and Sealed this

Twenty-first Day of October, 2008

JON W. DUDAS
*Director of the United States Patent and Trademark Office*